United States Patent [19]

Welgan

[11] 4,176,701
[45] Dec. 4, 1979

[54] CAMERA RAIN SHIELD

[76] Inventor: Peter R. Welgan, 1141 La Mirada, Laguna Beach, Calif. 92651

[21] Appl. No.: 946,664

[22] Filed: Sep. 28, 1978

[51] Int. Cl.² ............................................. G03B 17/56
[52] U.S. Cl. .................... 150/52 J; 354/64; 352/242
[58] Field of Search ........................ 150/52 J; 352/242; 354/64, 75, 76

[56] References Cited

U.S. PATENT DOCUMENTS

| | | | |
|---|---|---|---|
| 1,535,312 | 4/1925 | Hosking | 352/242 |
| 3,036,506 | 5/1962 | Andresen, Jr. | 354/64 |
| 4,033,392 | 7/1977 | Less | 150/52 J |

Primary Examiner—Hall George T.

[57] ABSTRACT

A shield with a body of optically clear flexible material in the basic shape of a rectangle slightly larger than a camera. The body has an elongated side with an elastic enclosure surrounding a round opening through which one's hand may be inserted to manipulate a camera. The front contains a round opening with an attached extension containing a peripherial elastic enclosure that surrounds the lens of the camera making the interface essentially water tight. Openings in the top of the invention provides penetrations through which carrying straps may be contained and the bottom and remaining side are provided with an opening through which a camera may be installed.

7 Claims, 4 Drawing Figures

U.S. Patent  Dec. 4, 1979  4,176,701
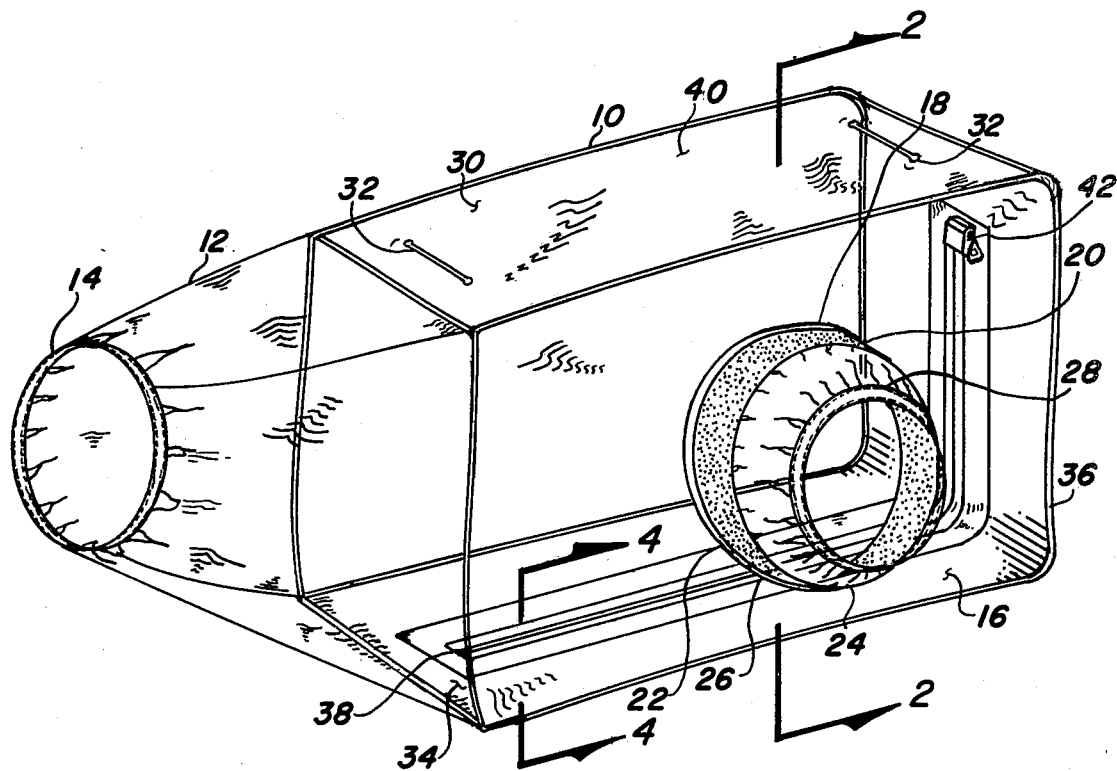
FIG. 1
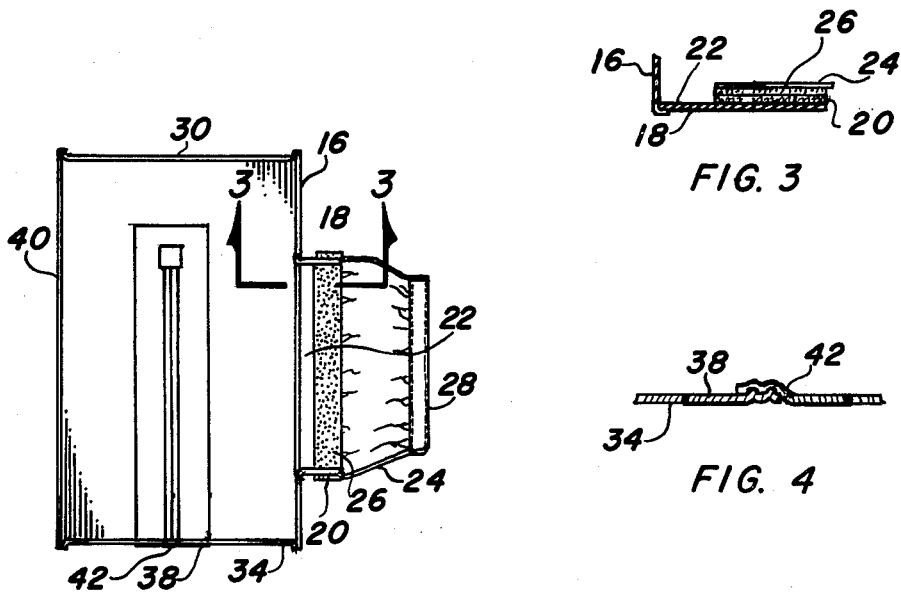
FIG. 2
FIG. 3
FIG. 4

CAMERA RAIN SHIELD

BACKGROUND OF THE INVENTION

1. Field of the Invention

This invention relates generally to covers and more specifically to photographic equipment, protective shields and covers.

2. Description of the Prior Art

Many different covers have been in use to protect equipment from adverse environmental conditions. Some contain openings for inserting one's hand with sleeves and elastic or drawn closures, however, prior art has been limited for specific purposes such as dark room type chambers, so called dust proof or clean chambers, sand blasting enclosures and many similar applications. Still others have been specifically utilized to protect photographic equipment from mechanical damage and exposure to the elements. Typically, prior art has been limited in application and utility to such purposes and the need for an apparatus to not only protect the camera from adverse environmental conditions but be able to operate the device simultaneously has been long needed and the instant invention is therefore directed to this end.

SUMMARY OF THE INVENTION

The problem of protecting a camera under extreme environments has long been present. This problem has been extenuated with the advent of expensive cameras expecially the single lens reflex type which is large, complex in its operation and extremely susceptible to damage by moisture penetrating its rotating lenses and other delicate mechanisms.

With this in mind it is the primary object of the invention to provide a cover that will protect a camera and its basic accessories from the elements.

Further, this invention allows the user to see the indica on the camera for normal operation and external visual use of the view finder and focusing adjustments.

Further, all of the settings and control features are visually apparent through the transparent cover allowing complete and accurate operation of the camera when enclosed within the invention.

An important object of the invention allows the insertion of the operators hand inside the cover with a closure tightly grasping the wrist to prevent the entrance of the elements. This allows complete flexibility to manually manipulate the apparatus in its full operational capabilities in an essentially normal matter.

Another object protects the enclosed camera equipment from the basic elements such as rain, fog, mist, steam, dirt, dust, sand, etc, that may be encountered when using camera equipment in adverse conditions.

Still another object of the invention provides an easily callapsible device that folds flat and is convenient to store in a small space and is light weight and durable.

Yet another object provides easy adaptation to most cameras with protruding lenses and in particular, single lens reflex type including a wide range of telephoto or extended lenses.

A further object of the invention also permits carrying straps to be attached to the camera while in the cover providing increased utility.

Another object allows the use of a defogging substance that may be applied to the internal surface of the invention to prevent moisture from collecting thereby distorting the optical qualities of the material or becoming transluscent.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment viewed from the front.

FIG. 2 is a cross-sectional view of the preferred embodiment taken along Lines 2—2 of FIG. 1.

FIG. 3 is a partial sectional view of the preferred embodiment taken along Lines 3—3 of FIG. 2.

FIG. 4 is a partial sectional view of the preferred embodiment taken along Lines 4—4 of FIG. 2.

DESCRIPTION OF THE PREFERRED EMBODIMENT

Referring now in detail to the drawings and describing the preferred embodiment, the invention consists of the body 10 that is made of an optically transparent substance that is substantially flexible such as a thermal plastic film of any suitable material such as acrylics, polystryenes, acetates, cellulose acetate butyrates, vinyls, polycarbonates or ionmers with polyvinyl being preferred. The thickness may vary from perhaps 0.0025 centimeters thick to the maximum thickness of the material's capability to still be flexible with 0.03 centimeters being preferred. The body is in the shape of a rectangle with a top, bottom, sides, front and back of a width capatable to enclose the conventional state of the art single lens reflex type camera. The right side 12, viewed from the usual normal operating position, is elongated forming a sleeve being rectangular shaped on the first end and reducing in size and shape to circular on the second end. This open circular end contains a contraction band 14 on the periphery that tightly engages the user's wrist for inserting one's hand inside the sleeve. This band 14 is formed of the parent material being folded to produce a hem with a flexible member being inserted and drawing the member together manually in draw string fashion to gather the material around the wrist. The preferred embodiment however, employs the use of an elastiomer embedded into a woven material to gather the sleeve and be readily expanded for use. This elastiomer is attached to the side by sewing or stitching with thread or other fastening means. The material of the right side 12 may be of any thickness with a gauge lighter than the body preferred such as 0.01 centimeters. The front of the body 16 contains a circular opening 18 located centrally. On the periphery of the opening and at right angles to the side is a band of looped filament tape 20. This is attached by fastening means to a sleeve 22 integral with the front 16. The fastening means includes bonding of adhesive, welding, sewing, or the like. Attached to the loop filament tape 20 is a radial opening extension 24 in the form of a tube with the back opening containing a plurality of monofilament hook tape 26 which mates with the above-mentioned loop tape 20. This combination is known by its registered trademark as VELCRO. The tape 20 is fastened to the extension 24 in like manner. The front end of the extension 24 contains an elastic constriction band 28 secured with fastening means. The diameter of the band 28 when retracted is compatible with the lens of the camera, particularly with single lens reflex type and securely holds the extension 24 in intimate contact with the lens. This provides a closure to prevent the entrance of elements that may damage or be detrimental to functioning of the camera. The extension 24 may be of varied length and a plurality of extensions may be utilized to fit many types of camera lens, sun shields and telephoto equipment. The front end of the extension 24 may also be in the embodiment containing a hem and a flexible member the same as previously described in the right side elongated sleeve 12. The body contains a top 30 with a plurality of slots 32 so located as to receive straps attached on the top or sides of the camera. The slots 32 preferably contain a relief hole in the ends to prevent the material from tearing at the points of stress in the terminus of the slot. The bottom 34 and left side 36 contain a continuous interconnecting opening 38 which provides a convenient entrance into the interior of the device to conveniently insert a camera. The flexible material of the body 10 allows the back 40 to be moved upward exposing the front 16 for easy access to the opening 18 for insertion of the lens. This opening 38 contains fastening means to maintain closure in the form of an interlocking zipper 42 of fabric material with plastic or metallic teeth however polyvinyl material is preferred with a metallic actuator to interlock plastic bulb shaped extrusions together.

Another embodiment utilizes a manually manipulated interlocking closure that is locked by pressing the mating grooved surfaces together forming a water tight seal. The body 10 is joined together at the corners by sewing or stitching with thread, bonding with an adhesive, chemically softening the mating surfaces until they become homogenious, ultrasonic welding by introducing a high frequency sound wave consentrated at the interface creating friction of the materials melting and fusing the materials together or the preferred method is to apply heat and pressure to weld the materials forming an air tight seam. The protective shield is used by opening the zipper 42 and inserting a camera into the interior with the lens protruding through the opening 18 in the front. The straps of the camera are disconnected and are inserted through slots 32 in the top 30 and reattached. A radial opening extension 24 is slid over the lens with a constriction band 28 holding the extension tightly in the front and the rear is then attached to the body by VELCRO tape 20 and 26. The operators hand is inserted into the left side sleeve 12 to manipulate the camera. The camera is then operated in a normal manner with the optical viewing device visable through the transparent back 40 of the shield. While the invention has been described in complete detail and pictorially shown in the accompanying drawing, it is not to be limited in such details since many changes and modifications may be in the invention without departing from the spirit and scope thereof. Hence, it is described to cover any and all modifications and forms which may come within the language and scope of the appended claims.

I claim:
1. A protective shield for a camera comprising:
   an optically transparent body with a bottom, elongated right side containing a opening, a left side, a back and a front with an opening;
   an elastic contraction band on the periphery of said opening on said elongated right side to tightly engage one's wrist and inserting one's hand therein;
   fastening means on said opening in said front continuing essentially around the periphery of the opening; and
   a radial opening extension in the form of a tube with a front and back end, the back end containing mating fastening means correspondingly engaging said opening in front to provide an enclosure in which a camera may be inserted with the lens exposed.
2. The body of the invention as recited in claim 1 further comprising: a top with a pair of slots through which camera straps may be inserted.
3. The protective shield as described in claim 1 wherein said bottom and left side further comprises: a continuous opening interconnecting the bottom and left side containing closing means to allow access to the interior of said shield to insert a camera therein.
4. The device as recited in claim 3 wherein: said closing means is a zipper affixed to said body.
5. The device as recited in claim 3 wherein: said closing means is a manually manipulated interlocking closure integral with said body.
6. The invention according to claim 1 further comprising: an elastic constriction band secured to said front end of said radial opening extension forming a closure around the lens of the camera to prevent deleterious elements from penetrating therein to.
7. The fastening means as recited in claim 1; being flexible looped filament tape and mating monofilament hook tape secured to said body and said radial opening extension forming a removable fastening device to allow interchangeability of various sizes of radial opening extensions for different camera configurations.

* * * * *